United States Patent
Davidson et al.

(10) Patent No.: US 6,415,378 B1
(45) Date of Patent: Jul. 2, 2002

(54) METHOD AND SYSTEM FOR TRACKING THE PROGRESS OF AN INSTRUCTION IN AN OUT-OF-ORDER PROCESSOR

(75) Inventors: Joel Roger Davidson, Austin; Judith K. Laurens, Elgin; Alexander Erik Mericas, Austin; Kevin F. Reick, Austin; Joel M. Tendler, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,359

(22) Filed: Jun. 30, 1999

(51) Int. Cl.⁷ .................. G06F 11/00; G06F 11/32
(52) U.S. Cl. .................................. 712/207; 714/51
(58) Field of Search .................. 712/207; 714/47, 714/51, 39, 37; 702/186

(56) References Cited

U.S. PATENT DOCUMENTS

| | | | | |
|---|---|---|---|---|
| 5,151,981 A | * | 9/1992 | Westcott | 714/50 |
| 5,347,647 A | * | 9/1994 | Allt | 714/28 |
| 5,809,450 A | | 9/1998 | Chrysos et al. | 702/186 |
| 5,862,381 A | * | 1/1999 | Advani | 717/7 |
| 5,987,598 A | * | 11/1999 | Levine | 712/227 |
| 6,000,044 A | * | 12/1999 | Chrysos | 714/47 |
| 6,052,802 A | * | 4/2000 | Zahir | 714/47 |
| 6,067,644 A | * | 5/2000 | Levine | 714/47 |

OTHER PUBLICATIONS

Profile Me: Hardware Support For Instruction Level Profiling On Out Of Order Processors; Dean et al.

* cited by examiner

*Primary Examiner*—Eric Coleman
(74) *Attorney, Agent, or Firm*—Duke W. Yee; Volel Emile; Michael R. Nichols

(57) ABSTRACT

A method and system for debugging the execution of an instruction within an instruction pipeline is provided. A processor in a data processing system contains instruction pipeline units. An instruction may be tagged, and in response to an instruction pipeline unit completing its processing of the tagged instruction, a stage completion signal is asserted. An execution monitor external to the pipelined processor monitors the stage completion signals during the execution of the tagged instruction. The execution monitor may be a logic analyzer that displays the stage completion signals in real-time on a display device of the execution monitor. An instruction to be tagged may be selected based upon an instruction selection rule, such as the address of the instruction.

32 Claims, 3 Drawing Sheets

METHOD AND SYSTEM FOR TRACKING THE PROGRESS OF AN INSTRUCTION IN AN OUT-OF-ORDER PROCESSOR

BACKGROUND OF THE INVENTION

1. Technical Field

The present invention relates generally to an improved data processing system and, in particular, to a method and system for debugging the execution of a processor within a data processing system.

2. Description of Related Art

In typical computer systems, system developers desire optimization of software execution for more effective system design. Usually, studies are performed to determine system efficiency in a program's access patterns to memory and interaction with a system's memory hierarchy. Understanding the memory hierarchy behavior helps optimize the system through the development of algorithms that schedule and/or partition tasks as well as distribute and structure data. Similarly, the utilization of a processor can be studied to understand the manner in which the execution of a program invokes various functions within the processor.

Many modern processors have the ability to execute instructions in an execution pipeline consisting of multiple stages. An instruction is fetched into a first stage and progresses from one stage to the next stage. Each unit along the pipeline operates on a different instruction by performing a single task for a particular stage of execution of the particular instruction. In addition, many modern processors execute instructions out-of-order with respect to the sequence in which the programmer coded the instructions or in which the compiler generated the instructions. As a result, instructions are completed, or retired, in order but execute as their data dependencies allow.

The debugging of hardware requires knowledge about the use of processor resources. However, in a processor with out-of-order execution of instructions, the out-of-order characteristic increases the difficulty of debugging the execution of a set of instructions. The ability to process instructions out-of-order may be disabled, but this attempt to debug an instruction may mask or avoid the very problem being debugged.

Therefore, it would be advantageous to have a method and system for accurately monitoring the use of resources within a processor that performs out-of-order execution of instructions. It would be further advantageous to have a method and system for providing knowledge of when the stages of a pipeline execute.

SUMMARY OF THE INVENTION

The present invention provides a method and system for debugging the execution of an instruction within an instruction pipeline. A processor in a data processing system contains instruction pipeline units. An instruction may be tagged, and in response to an instruction pipeline unit completing its processing of the tagged instruction, a stage completion signal is asserted. An execution monitor external to the pipelined processor monitors the stage completion signals during the execution of the tagged instruction. The execution monitor may be a logic analyzer that displays the stage completion signals in real-time on a display device of the execution monitor. An instruction to be tagged may be selected based upon an instruction selection rule, such as the address of the instruction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
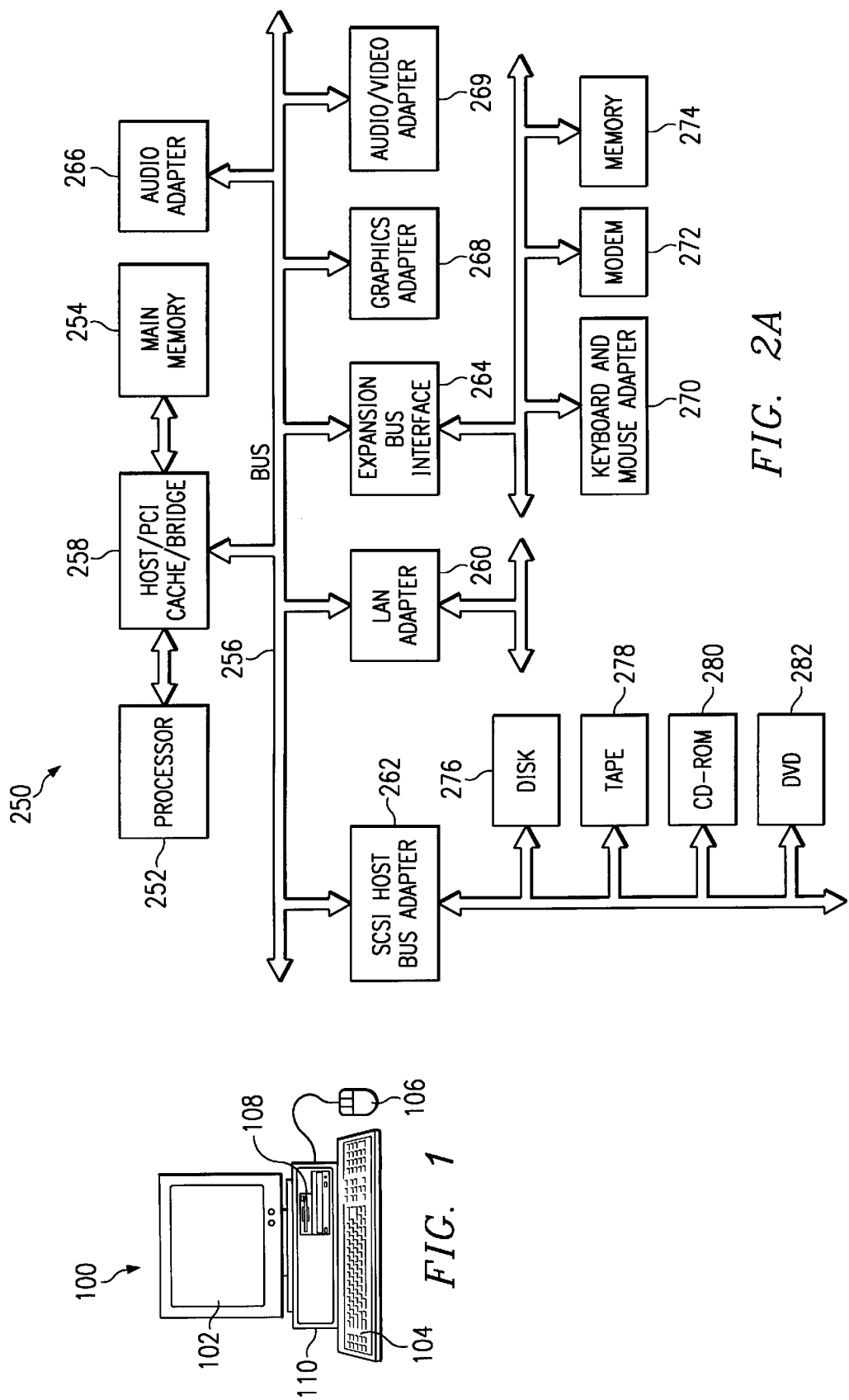
FIG. 1 depicts a data processing system in which the present invention may be implemented.

With reference now to FIG. 1, a pictorial representation depicts a data processing system in which the present invention may be implemented. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer. Although the depicted representation shows a personal computer, other embodiments of the present invention may be implemented in other types of data processing systems, such as mainframes, servers, workstations, network computers, Internet appliances, palm computers, etc. System unit 110 comprises memory, a central processing unit, I/O unit, etc. However, in the present invention, system unit 110 contains a speculative processor, either as the central processing unit or as one of multiple CPUs present in the system unit.

Figure 2:
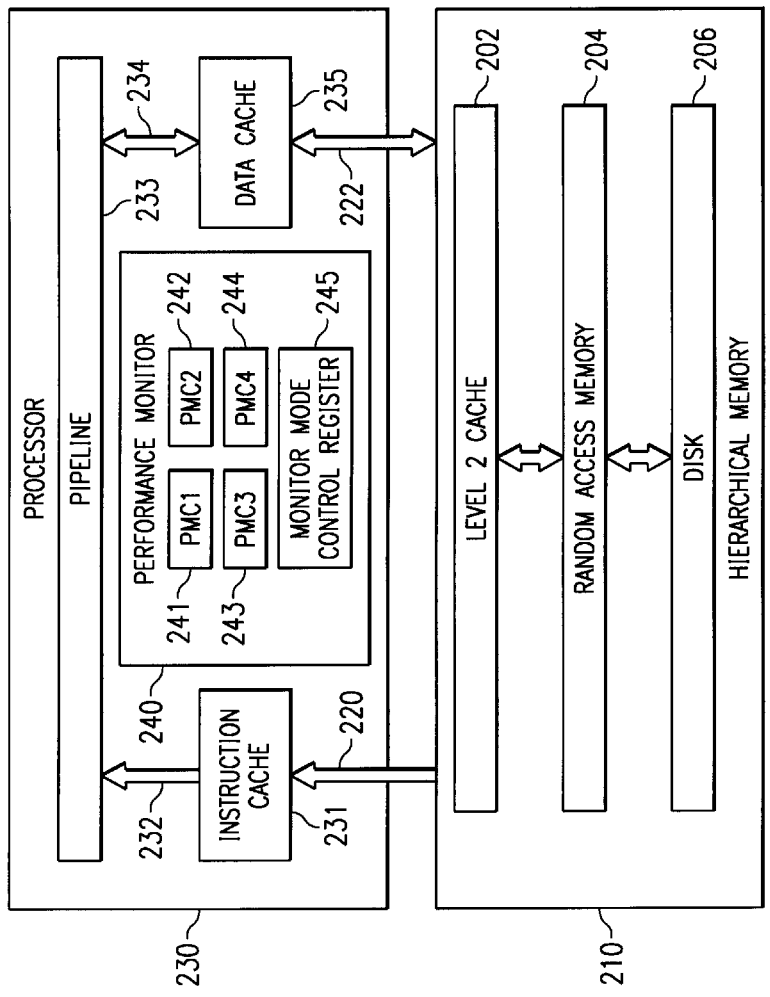
FIG. 2A is a block diagram depicting a data processing system in which the present invention may be implemented.
FIG. 2B is a block diagram depicting selected internal functional units of a data processing system that may include the present invention.
FIG. 2C is an illustration depicting an example representation of one configuration of an MMCR suitable for controlling the operation of two PMCs.

With reference now to FIG. 2A, a block diagram of a data processing system in which the present invention may be implemented is illustrated. Data processing system 250 is an example of a computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, CD-ROM 280, and DVD 282 in the depicted example. Typical PCI local bus implementations will support three or four PCI expansion slots or add-in connectors.

An operating system runs on processor 252 and is used to coordinate and provide control of various components within data processing system 250 in FIG. 2A. The operating system may be a commercially available operating system such as Java OS or OS/2, which are available from International Business Machines Corporation. An object oriented programming system such as Java may run in conjunction with the operating system and provides calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Often times, hard disk drives are absent and memory is constrained when data processing system 250 is used as a network client.

Those of ordinary skill in the art will appreciate that the hardware in FIG. 2A may vary depending on the implementation. For example, other peripheral devices, such as optical disk drives and the like may be used in addition to or in place of the hardware depicted in FIG. 2A. The depicted example is not meant to imply architectural limitations with respect to the present invention. For example, the processes of the present invention may be applied to a multiprocessor data processing system.

With reference now to FIG. 2B, a block diagram depicts selected internal functional units of a data processing system that may include the present invention. System 200 comprises hierarchical memory 210 and processor 230. Hierarchical memory 210 comprises Level 2 cache 202, random access memory (RAM) 204, and disk 206. Level 2 cache 202 provides a fast access cache to data and instructions that may be stored in RAM 204 in a manner which is well-known in the art. RAM 204 provides main memory storage for data and instructions that may also provide a cache for data and instructions stored on nonvolatile disk 206.

Data and instructions may be transferred to processor 230 from hierarchical memory 210 on instruction transfer path 220 and data transfer path 222. Instruction transfer path 220 and data transfer path 222 may be implemented as a single bus or as separate buses between processor 230 and hierarchical memory 210. Alternatively, a single bus may transfer data and instructions between processor 230 and hierarchical memory 210 while processor 230 provides separate instruction and data transfer paths within processor 230, such as instruction bus 232 and data bus 234.

Processor 230 also comprises instruction cache 231, data cache 235, performance monitor 240, and instruction pipeline 233. Performance monitor 240 comprises performance monitor counter (PMC1) 241, performance monitor counter (PMC2) 242, performance monitor counter (PMC3) 243, performance monitor counter (PMC4) 244, and monitor mode control register (MMCR) 245. Alternatively, processor 230 may have other counters and control registers not shown.

Processor 230 includes a pipelined processor capable of executing multiple instructions in a single cycle, such as the PowerPC family of reduced instruction set computing (RISC) processors. During operation of system 200, instructions and data are stored in hierarchical memory 210. Instructions to be executed are transferred to instruction pipeline 233 via instruction cache 231. Instruction cache 231 contains instructions that have been cached for execution within pipeline 233. Some instructions transfer data to or from hierarchical memory 210 via data cache 235. Other instructions may operate on data loaded from memory or may control the flow of instructions.

Performance monitor 240 comprises event detection and control logic, including PMC1–PCM4 241–244 and MMCR 245. Performance monitor 240 is a software-accessible mechanism intended to provide detailed information with significant granularity concerning the utilization of processor instruction execution and storage control. The performance monitor may include an implementation-dependent number of performance monitor counters (PMCs) used to count processor/storage related events. These counters may also be termed "global counters". The MMCRs establish the function of the counters with each MMCR usually controlling some number of counters. The PMCs and the MMCRs are typically special purpose registers physically residing on the processor. These registers are accessible for read or write operations via special instructions for that purpose. The write operation is preferably only allowed in a privileged or supervisor state, while reading is preferably allowed in a problem state since reading the special purpose registers does not change a register's content. In a different embodiment, these registers may be accessible by other means such as addresses in I/O space. In the preferred embodiment, PMC1–PMC4 are 32-bit counters and MMCR is a 32-bit register. One skilled in the art will appreciate that the size of the counters and the control registers are dependent upon design considerations, including the cost of manufacture, the desired functionality of processor 230, and the chip area available within processor 230.

Performance monitor 240 monitors the entire system and accumulates counts of events that occur as the result of processing instructions. In the present invention, processor 230 allows instructions to execute out-of-order with respect to the order in which the instructions were coded by a programmer or were ordered during program compilation by a compiler. Processor 230 may also employ speculative execution to predict the outcome of conditional branches of certain instructions before the data on which the certain instructions depend is available. The MMCRs are partitioned into bit fields that allow for event/signal selection to be recorded/counted. Selection of an allowable combination of events causes the counters to operate concurrently. When the performance monitor is used in conjunction with instructions executed out-of-order in the manner provided by the present invention, the performance monitor may be used as a mechanism to monitor the performance of the stages of the instruction pipeline.

With reference now to FIG. 2C, an illustration provides an example representation of one configuration of an MMCR suitable for controlling the operation of two PMCs. As shown in the example, an MMCR is partitioned into a number of bit fields whose settings select events to be counted, enable performance monitor interrupts, and specify the conditions under which counting is enabled. Alternatively, an MMCR may set an initialization value, such as a temporal threshold value for a time interval in which a stage of the instruction pipeline is expected to execute for a given instruction, which is not shown in FIG. 2C.

The initialization value is both variable and software selectable. The initialization value may be loaded into a table or register when an instruction is first scheduled for execution. For example, given that an event under study is "register accesses", if the initialization value denotes a number of register accesses for an associated instruction, then completion of the instruction allows the number of register accesses for the particular instruction to be added to the total event count in a PMC that counts all register accesses by all instructions of course, depending on the data instruction being executed, "complete" may have different meanings. For example, for a "load" instruction, "complete" indicates that the data associated with the instruction was received, while for a "store" instruction, "complete" indicates that the data was successfully written. A user-readable counter, e.g., PMC1, then provides software access of the total number of register accesses since PMC1 was first initialized. With the appropriate values, the performance monitor is readily configured for use in identifying a variety of system performance characteristics.

Bits 0–4 and 18 of the MMCR in FIG. 2C determine the scenarios under which counting is enabled. By way of example, bit 0 may be a freeze counting bit such that when the bit is set, the values in the PMCs are not changed by hardware events, i.e. counting is frozen. Bits 1–4 may indicate other specific conditions under which counting is performed. Bits 5, 16, and 17 are utilized to control interrupt signals triggered by PMCs. Bits 6–15 may be utilized to control time or event-based transitions. Bits 19–25 may be used for event selection for PMC1, i.e. selection of signals to be counted for PMC1. Bits 26–31 may be used for event selection for PMC2, i.e. selection of signals to be counted for PMC2. The function and number of bits may be chosen as necessary for selection of events as needed within a particular implementation.

Figure 3:
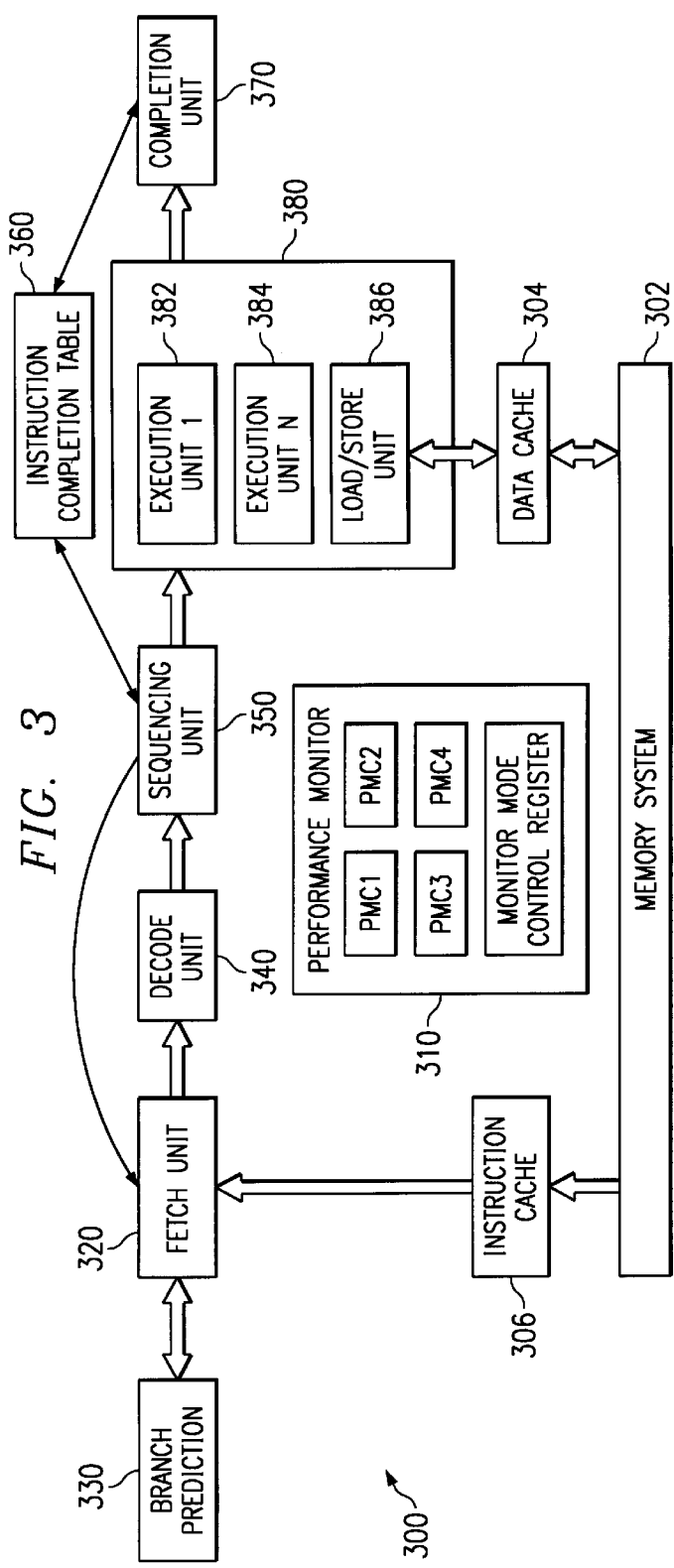
FIG. 3 is a block diagram depicting further details of the stages of an instruction pipeline within an out-of-order execution processor.

With reference now to FIG. 3, a block diagram depicts further details of the stages of an instruction pipeline within an out-of-order execution processor. System 300 shows memory system 302, data cache 304, instruction cache 306, and performance monitor 310, which may be similar to the hierarchical memory, data cache, instruction cache, and performance monitor shown in FIG. 2B. As instructions are executed, they cause events within the processor, such as cache accesses. Performance monitor 310 contains a plurality of PMCs that count events under the control of one or more MMCRs. The counters and the MMCRs are internal processor registers and can be read or written under software control.

Fetch unit 320 retrieves instructions from instruction cache 306, which in turn retrieves instructions from memory 302. Decode unit 340 decodes instructions to determine basic information about the instruction, such as instruction type, source registers, and destination registers. Sequencing unit 350 uses the decoded information to schedule instructions for execution. In order to track instructions, completion table 360 is used for storing and retrieving information about scheduled instructions. As sequencing unit 350 assigns the dispatched instruction to an associated entry in completion table 360, sequencing unit 350 assigns or associates entries to executing instructions on a first-in, first-out basis or rotating manner. As the instructions are executed, information concerning the executing instructions is stored into various fields and subfields of the associated entry of completion table 360 for the particular instruction.

Instructions executed by execution control unit 380 using one of the execution units 1–N, such as execution unit #1 382 or execution unit #N 384, may use load/store unit 386 to cause data to be read from or written to memory 302 via data cache 304. As instructions complete, completion unit 370 commits the results of the execution of the instructions, and the destination registers of the instructions are made available for use by subsequent instructions. Any instructions may be issued to the appropriate execution unit as soon as its source registers are available.

Instructions are fetched and completed sequentially until a control (branch) instruction alters the instruction flow, either conditionally or unconditionally. A control instruction specifies a new data location from which to begin fetching instructions. When fetch unit 320 receives a conditional branch operation and the data upon which the condition is based is not yet available (e.g., the instruction that will produce the necessary data has not been executed), fetch unit 320 may use one or more branch prediction mechanisms in branch prediction control unit 330 to predict the outcome of the condition. Control is then speculatively altered until the results of the condition can be determined. If the branch was correctly predicted, operation continues. If the prediction was incorrect, all instructions along the speculative path are canceled or flushed.

Since speculative instructions can not complete until the branch condition is resolved, many high performance out-of-order processors provide a mechanism to map physical registers to virtual registers. The result of execution is written to the virtual register when the instruction has finished executing. Physical registers are not updated until an instruction actually completes. Any instructions dependent upon the results of a previous instruction may begin execution as soon as the virtual register is written. In this way, a long stream of speculative instructions can be executed before determining the outcome of the conditional branch.

Figure 4:
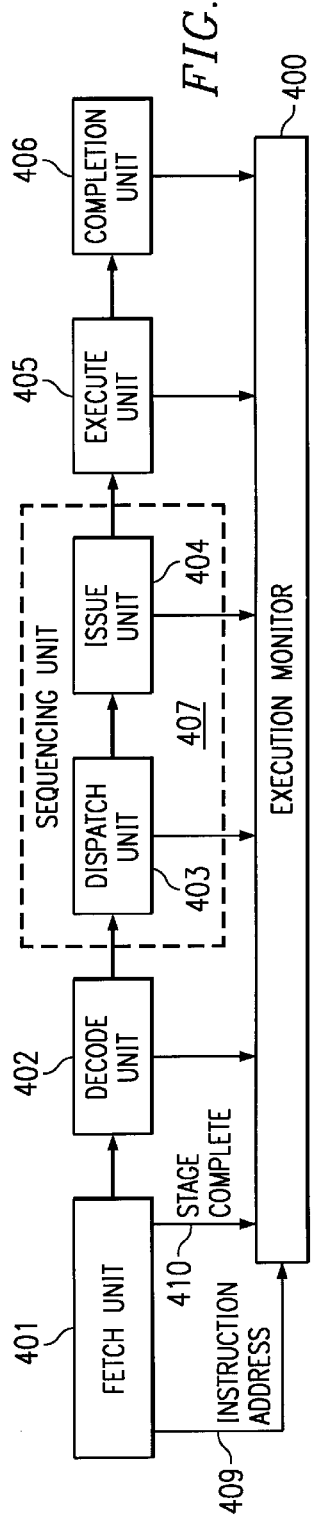
FIG. 4 is a block diagram depicting a simplified view of a pipelined processor that is capable of monitoring the execution of individual stages of an instruction pipeline.

With reference now to FIG. 4, a block diagram depicts a simplified view of a pipelined processor that is capable of monitoring the execution of individual stages of an instruction pipeline. Units 401–406 depict individual stages of an instruction pipeline. Fetch unit 401 fetches instructions from memory, and decode unit 402 decodes the instructions to determine the type of instruction, its operands, and the destination of its result. Dispatch unit 403 requests operands for an instruction, and issue unit 404 determines that an instruction may proceed with execution. Execute unit 405 performs the operation on the operands as indicated by the type of instruction. Completion unit 406 deallocates any internal processor resources, such as the commitment of registers, that were required by the instruction. An instruction pipeline may have more or less stages. For example, the functions of dispatch unit 403 and issue unit 404 may be performed by a single unit, shown as optional sequencing unit 407.

As an instruction is fetched, a single instruction may be selected and marked (or tagged). As the marked instruction flows through each pipeline unit representing a stage of the instruction pipeline, each pipeline unit signals its completion of the processing for the marked instruction by asserting a stage complete signal, such as signal 410. Execution monitor 400 collects the signals and displays the signals, preferably in real-time.

Execution monitor 400 may be a logic analyzer that allows a person attempting to debug the execution of an instruction pipeline to view the stage completion signals. The logic analyzer may be programmable so that the stage completion signals may be manipulated in a variety of ways. The logic analyzer may collect the signals, store the timing of the signals, and then replay the signals for later debugging. In this manner, a user of the present invention may visually inspect the manner in which an instruction pipeline is executing.

An instruction is described as "flowing" through an instruction pipeline, although the execution proceeds unit-by-unit. An instruction commences a process of execution by being fetched from storage and inserted into the instruction pipeline. When an instruction completes its execution within an instruction pipeline stage, it may be described as entering the next stage in the instruction pipeline.

Alternatively, each pipeline unit may signal its completion of any instruction without the requirement that the instruction was previously tagged.

Alternatively, a completion signal may be generated by each pipeline unit at a particular point in time that may depend on other architectural details of the processor. For example, the completion signal may be asserted in response to other signals within the processor.

If only a single marked instruction may proceed through the instruction pipeline at any given time, then the instruction may be simply marked with a single bit. If multiple instructions may be marked, then a tag consisting of multiple bits may identify marked instructions.

Instructions may be marked based on a variety of selection mechanisms or instruction selection rules. An instruction may be selected at random, in which case the execution monitor may capture the instruction address after the instruction has been randomly selected, e.g., by receiving instruction address 409 from fetch unit 401. An instruction may be selected based on a general category of its instruction type, such as any store instruction. A specific type of instruction may be selected, such as a load instruction that uses particular registers. As another alternative, an instruction may be selected based on its instruction address, which provides functionality for a debugging program to store specific instructions at specific addresses and then to allow the processor to execute the instructions without setting interrupts or traps. The above list merely provides some examples and should not be considered an exhaustive list of potential instruction selection mechanisms.

Alternatively, the selection mechanisms or instruction selection rules may be under the control of the performance monitor within the processor. Through a debugging tool, the performance monitor may receive preferences for the instruction selection rules. The performance monitor may then ensure the proper set of instructions are tagged for monitoring by the execution monitor.

The advantages provided by the present invention are apparent in light of the detailed description of the invention provided above. Under certain circumstances, it is possible for the processor to behave unexpectedly during execution of a certain instruction. If that instruction executes unexpectedly, then each time the instruction executes, it may cause a unexpected results for the entire instruction pipeline. The entire performance of the processor may be severely degraded because an instruction pipeline requires a smooth flow of instructions to reduce the average time required to execute a set of instructions.

If the instruction stalls within a particular stage of execution, then the instruction may create a bottleneck only at one particular stage of the instruction pipeline. The present invention allows the detection of unexpected results or unexpected ordering during instruction execution at individual stages of the instruction pipeline.

A more likely scenario is that particular instructions execute unexpectedly only when certain other factors are present that contribute to an execution anomaly. For example, a particular type of instruction may require execute erratically within the decoding stage of the instruction pipeline only when another type of instruction is within a sequencing stage of the instruction pipeline. Since instructions may be processed out-of-order, it may be difficult to debug a set of instructions without knowing the order in which the instructions appear within the instruction pipeline. By being able to monitor the execution of an instruction within individual stages of the instruction pipeline, the entire instruction pipeline may be monitored to determine other factors affecting the performance of the instruction pipeline.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of monitoring the execution of an instruction within a pipelined processor, wherein the pipelined processor comprises a plurality of instruction pipeline units, the method comprising:

asserting a stage completion signal in response to an instruction pipeline unit completing its processing of an instruction; and transmitting the stage completion signal over at least one data line external to the pipelined processor for monitoring by an execution monitor external to the pipelined processor during the execution of the instruction.

2. The method of claim 1 wherein the execution monitor is a logic analyzer.

3. The method of claim 1 further comprising:

displaying the stage completion signals in real-time on a display device of the execution monitor.

4. A method of monitoring the execution of an instruction within a pipelined processor, wherein the pipelined processor comprises a plurality of instruction pipeline units, the method comprising:

tagging an instruction to be executed;

asserting a stage completion signal in response to an instruction pipeline unit completing its processing of the tagged instruction; and transmitting the stage completion signal over at least one data line external to the pipelined processor for monitoring by an execution monitor external to the pipelined processor during the execution of the instruction.

5. The method of claim 4 wherein the execution monitor is a logic analyzer.

6. The method of claim 4 further comprising:

displaying the stage completion signals in real-time on a display device of the execution monitor.

7. The method of claim 4 wherein a plurality of tagged instructions may be monitored simultaneously by the execution monitor.

8. The method of claim 4 further comprising:

selecting an instruction to be tagged based upon an instruction address.

9. The method of claim 4 further comprising:

selecting an instruction to be tagged at random.

10. The method of claim 4 further comprising:

selecting an instruction to be tagged based upon a general category of instruction.

11. The method of claim 4 further comprising:

selecting an instruction to be tagged based upon a specific type of instruction.

12. The method of claim 4 further comprising:

selecting, via a performance monitor within the pipelined processor, an instruction to be tagged for monitoring by the execution monitor.

13. The method of claim 4 further comprising:

receiving, at the execution monitor external to the pipelined processor, an instruction address of the tagged instruction during the execution of the tagged instruction.

14. An execution monitor for monitoring a pipelined processor, wherein the pipelined processor comprises a plurality of instruction pipeline units, the execution monitor comprising:

receiving means for receiving from at least one data line external to the pipelined processor, stage completion signals in response to an instruction pipeline unit completing its processing of an instruction; and displaying means for displaying the stage completion signals.

15. The execution monitor of claim 14 further comprising a logic analyzer.

16. A data processing system for monitoring a pipelined processor, wherein the pipelined processor comprises a plurality of instruction pipeline units, the data processing system comprising:

tagging means for tagging an instruction to be executed;

generating means for generating a stage completion signal in response to an instruction pipeline unit completing its processing of the tagged instruction; and transmitting means for transmitting stage completion signals out of the pipelined processor for monitoring the stage completion signals external to the pipelined processor during the execution of the tagged instruction.

17. The data processing system of claim 16 wherein the monitoring means comprises a logic analyzer.

18. The data processing system of claim 16 further comprising:

displaying means for displaying the stage completion signals.

19. The data processing system of claim 16 wherein a plurality of tagged instructions may be monitored simultaneously by the monitoring means.

20. The data processing system of claim 16 further comprising:

selecting means selecting an instruction to be tagged based upon an instruction address.

21. The data processing system of claim 16 further comprising:

selecting means for selecting an instruction to be tagged at random.

22. The data processing system of claim 16 further comprising:

selecting means for selecting an instruction to be tagged based upon a general category of instruction.

23. The data processing system of claim 16 further comprising:

selecting means for selecting an instruction to be tagged based upon a specific type of instruction.

24. The data processing system of claim 16 further comprising:

selecting means for selecting, via a performance monitor within the pipelined processor, an instruction to be tagged for monitoring by the monitoring means.

25. The data processing system of claim 16 further comprising:

receiving means for receiving an instruction address of the tagged instruction at the monitoring means.

26. A computer program product on a computer readable medium for use in a data processing system for monitoring a pipelined processor, wherein the pipelined processor comprises a plurality of instruction pipeline units, the computer program product comprising:

first instructions for receiving from data lines external to the pipelined processor, stage completion signals in response to an instruction pipeline unit completing its processing of an instruction; and second instructions for displaying the stage completion signals.

27. The execution monitor of claim 26 wherein the data processing system comprises a logic analyzer.

28. A computer program product on a computer readable medium for use in a data processing system for monitoring a pipelined processor, wherein the pipelined processor comprises a plurality of instruction pipeline units, the computer program product comprising:

instructions for tagging an instruction;

instructions for generating a stage completion signal in response to an instruction pipeline unit completing its processing of the tagged instruction; and for transmitting stage completion signals out of the pipelined processor for monitoring the stage completion signals external to the pipelined processor during the execution of the tagged instruction.

29. The computer program product of claim 28 wherein the data processing system comprises a logic analyzer.

30. The computer program product of claim 28 further comprising:

instructions for displaying the stage completion signals.

31. The computer program product of claim 28 wherein a plurality of tagged instructions may be monitored simultaneously.

32. The computer program product of claim 28 further comprising:

instructions for selecting an instruction to be tagged based upon an instruction selection rule.

* * * * *